US011888848B1

(12) United States Patent
Wright et al.

(10) Patent No.: US 11,888,848 B1
(45) Date of Patent: Jan. 30, 2024

(54) TWO-FACTOR AUTHENTICATION WITH PUBLIC KEY INFRASTRUCTURE

(71) Applicant: Syniverse Technologies, LLC, Tampa, FL (US)

(72) Inventors: Chris Wright, Plant City, FL (US); Rajan John Thomas, Sanford, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 18/214,644

(22) Filed: Jun. 27, 2023

Related U.S. Application Data

(60) Provisional application No. 63/394,660, filed on Aug. 3, 2022.

(51) Int. Cl.
*H04L 9/40* (2022.01)
(52) U.S. Cl.
CPC ...... *H04L 63/0876* (2013.01); *H04L 63/0428* (2013.01); *H04L 2463/082* (2013.01)
(58) Field of Classification Search
CPC ............. H04L 63/0876; H04L 63/0428; H04L 2463/082
See application file for complete search history.

(56) References Cited

U.S. PATENT DOCUMENTS

| 2018/0048461 A1* | 2/2018 | Jutla ...................... H04L 9/3268 |
| 2018/0227128 A1* | 8/2018 | Church .................. H04L 9/3247 |
| 2019/0124063 A1* | 4/2019 | Cui ........................ H04L 63/0853 |
| 2019/0334921 A1* | 10/2019 | Pattar ..................... H04L 9/3271 |

* cited by examiner

*Primary Examiner* — Khoi V Le
(74) *Attorney, Agent, or Firm* — Anton J. Hopen; Smith & Hopen, P.A.

(57) ABSTRACT

This invention pertains to a method for provisioning and implementing two-factor authentication (2FA) for enterprise services. The system securely establishes a trusted identity for a subscriber device using an immutable hardware key and public/private key sets. The device's identity is verified by an Original Equipment Manufacturer (OEM) cloud service. The method includes generating unique transaction nonces for each 2FA request, securing private keys within a Trusted Execution Environment (TEE), and employing a cloud wallet service to store keys. The subscriber device interacts with the system, decrypting and re-encrypting transaction nonces using corresponding keys. This process enables secure transaction from enterprise applications. The system also integrates user consent into the 2FA process, displaying a prompt to approve or deny authentication. This technology enhances security in enterprise services, prioritizing user consent and secure data transfer.

9 Claims, 4 Drawing Sheets

TWO-FACTOR AUTHENTICATION WITH PUBLIC KEY INFRASTRUCTURE

PRIORITY CLAIM

This application claims priority to U.S. Provisional Patent No. 63/394,660 filed Aug. 3, 2022, entitled "Two-Factor Authentication Bypass."

BACKGROUND OF THE INVENTION

1. Field of the Invention

This invention relates generally to the field of computer networks, specifically to providing multi-factor authentication for secure communications.

2. Brief Description of the Related Art

Multi-factor authentication (or two-factor authentication, e.g., 2FA) typically refers to using different "bands" of communication to authenticate the identity of a user. For example, over a HTTPS (Hypertext Transfer Protocol Secure) connection a user may enter a username and password. However, if the username and password are compromised a third party could access an otherwise secure system. Therefore, many systems are configured to require additional evidence of identity beyond what the user "knows" (e.g., the username/password combination). Additional evidence may include an object the user possesses (e.g., a hardware device), a characteristic unique to the user (e.g., facial recognition, voice, fingerprint, etc. . . . ) or spatial location (e.g., geofencing).

Virtually all forms of authentication impact the user experience and create friction in the operation of the computing system. When a user must remember a password, key in a one-time-password (OTP), press a finger to a scanner for biometric authentication there is a delay in the ultimate objective to use the secure computing system. One specific example is receiving an OTP via messaging and putting that message into an enterprise application (e.g., banking or healthcare) for 2FA. The OTP is most often a text message sent over a mobile network to a hardware device secured by a subscriber identity module (SIM) card on a smartphone. The 2FA in this case is using the integrated circuit of the SIM card as an authentication message to verify the user has possession of an object. What is needed is a more efficient, seamless and secure system to authenticate the hardware device in possession of the authenticating user.

SUMMARY OF THE INVENTION

An embodiment of the invention relates to provisioning a subscriber device (e.g., smartphone) to authenticate under this process. Provisioning the device includes the steps of registering an enterprise service with a cloud authentication service (CAS) for two-factor authentication. The enterprise service may be any platform that seeks secure authentication validation such as a financial institution, medical provider or the like.

A trusted application on a subscriber device sends the device identity and data to the CAS, the blob comprising device identity and generated public key, fully encrypted and signed with the OEM's device specific hardware key. At the OEM Cloud service, the device identity is validated, and the contents are decoded with the OEM's hardware key for that device as the OEM Cloud service has trusted knowledge of the immutable hardware key on the subscriber device. After receiving the public key from the OEM Cloud service, a public/private key set is generated by the CAS for the trusted app and the device combination. The public/private key set includes a public key for the CAS and a private key for the CAS. In a cloud wallet service (CWS) the private key for the CAS and the public key for the subscriber device for the trusted app are stored. To the subscriber device, the public key for the CAS is sent whereby a private key for the trusted app of the subscriber device and the public key for the CAS are resident on the subscriber device in a trusted execution environment (TEE).

To operate the 2FA function under an embodiment of the invention, the enterprise service makes a request for 2FA after the enterprise app makes a request for information. The request for the 2FA is sent to the CAS. The CAS generates a transaction nonce unique to the 2FA request. The nonce is encrypted with the trusted app's public key for the subscriber request previously obtained in the provisioning process. A 2FA challenge is sent to the trusted application on the subscriber device. The challenge includes the encrypted nonce and a consent required flag along with the context message to display to the user (like a bank transaction) The encrypted nonce is decrypted with a private key for the subscriber device, the private key maintained in a trusted execution environment (TEE) on the subscriber device. A user consent alert is prompted on the subscriber device if required by the consent required flag transmitted along with the nonce. A nonce with a response to the user consent alert (if required) is encrypted again but this time with a public key for the CAS. The CAS then receives from the subscriber device the encrypted nonce and data with the consent response. The CAS decrypts the nonce at the CAS with a private key for the CAS. The response is then validated with the decrypted nonce to generate a validation result. The validation result is then passed onto the enterprise service wherein the enterprise service allows or denies the request for information to the enterprise app based on the validation result.

The method also includes additional steps that further refine the two-factor authentication (2FA) process. In one of these steps, the transaction nonce sent to the subscriber device for 2FA includes a 'consent required' flag. This flag triggers a user interface prompt on the subscriber device, thus presenting the end user with an option to approve or deny the 2FA authentication request.

Building upon this, the transaction nonce, in conjunction with the 'consent required' flag, also carries a message string of characters and/or display markup. This string is used to present the user interface prompt on the subscriber device. Therefore, the end user is provided with an interactive interface to engage with and respond to the 2FA request, thereby enhancing user control over the 2FA process.

In yet another embodiment, the system can use the Key Derivation function to derive keys based on public key generated on the device and the cloud to come up with a symmetric key which can be used for encryption/decryption rather than the public and private key itself.

BRIEF DESCRIPTION OF THE DRAWINGS

For a fuller understanding of the invention, reference should be made to the following detailed disclosure, taken in connection with the accompanying drawings, in which.

DETAILED DESCRIPTION

In the following detailed description of the preferred embodiment, reference is made to the accompanying drawings, which form a part hereof, and within which specific embodiments are shown by way of illustration by which the invention may be practiced. It is to be understood that other embodiments may be utilized, and changes may be made without departing from the scope of the invention.

Figure 1:
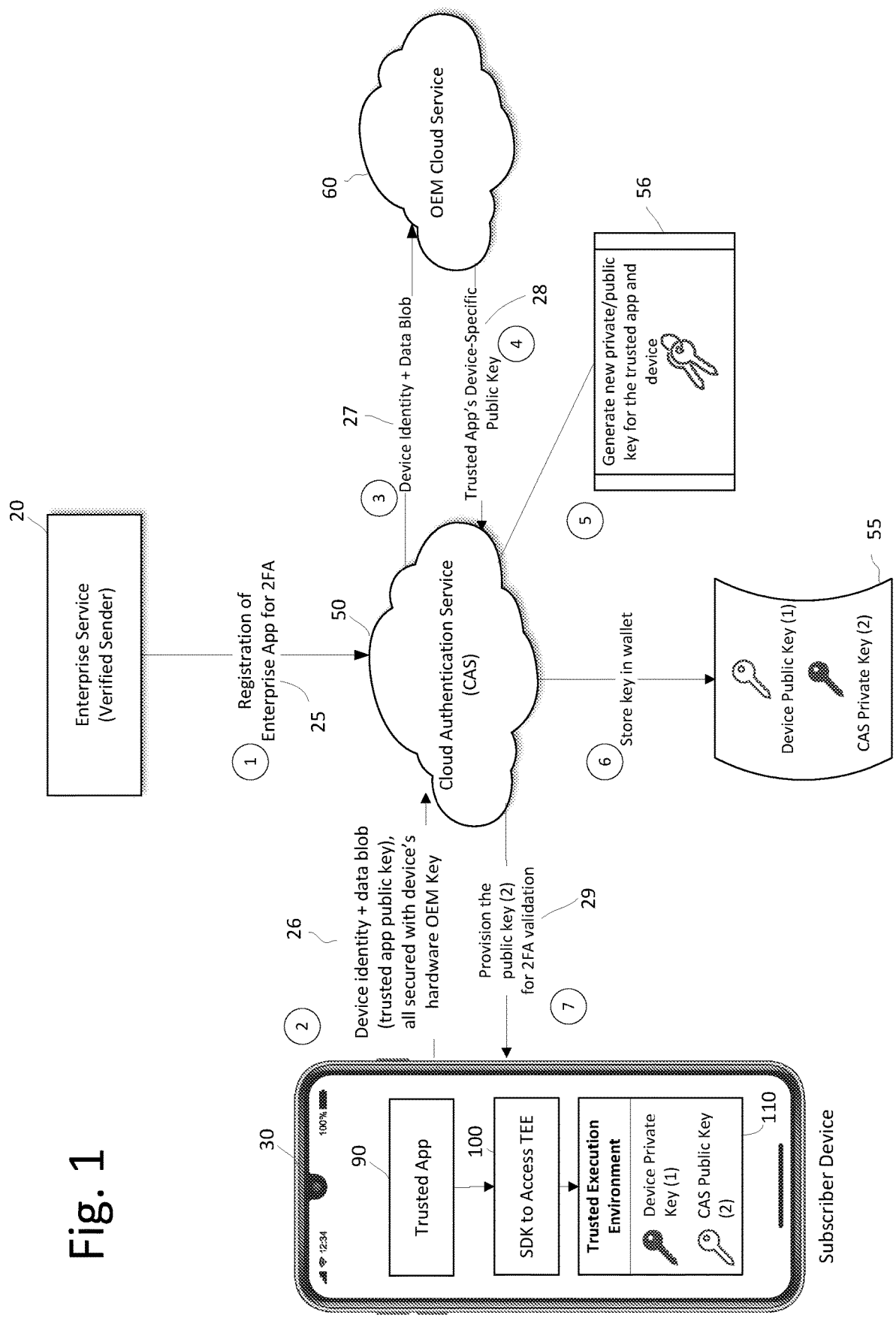
FIG. 1 is a diagrammatic view of an embodiment of the invention provisioning the authentication service.

FIG. 1 shows the sequence of the provisioning process wherein an enterprise service 20 (which is verified as trusted) sends a registration request of an enterprise application 25 for two-factor authentication (2FA) to a cloud authentication service 50 (CAS). Subscriber device 30 contains trusted application 90 which through SDK 100 accesses a trusted execution environment (TEE) 110. TEE 110 stores a private key for the subscriber device a public key for the CAS 50. The TEE 110 has an immutable OEM device hardware key which is used by trusted app 90 to encrypt and sign the device identity and data blob (trusted app public key) 26 through CAS 50 as device identity and data blog 27 to an OEM cloud service (OCS) 60 for further verification. OEM Cloud Service 60, having existing knowledge of the proper hardware key for the subscriber device 30 attests to its identity and transmits 28 back to CAS 50 a subscriber device-specific public key for trusted app 90. CAS generates a new public/private key set 56 for the trusted app 90 and device 30. Therefore, at this provisioning stage there is a first public/private key set for the subscriber device and a second public/private key set for the CAS. In a cloud wallet service 55 the subscriber device public key and the CAS private key are stored. The CAS then provisions 29 subscriber device 30 with the CAS public key for later 2FA authentication. The CAS public key is stored in TEE 110 along with the private key for the subscriber device.

Figure 2:
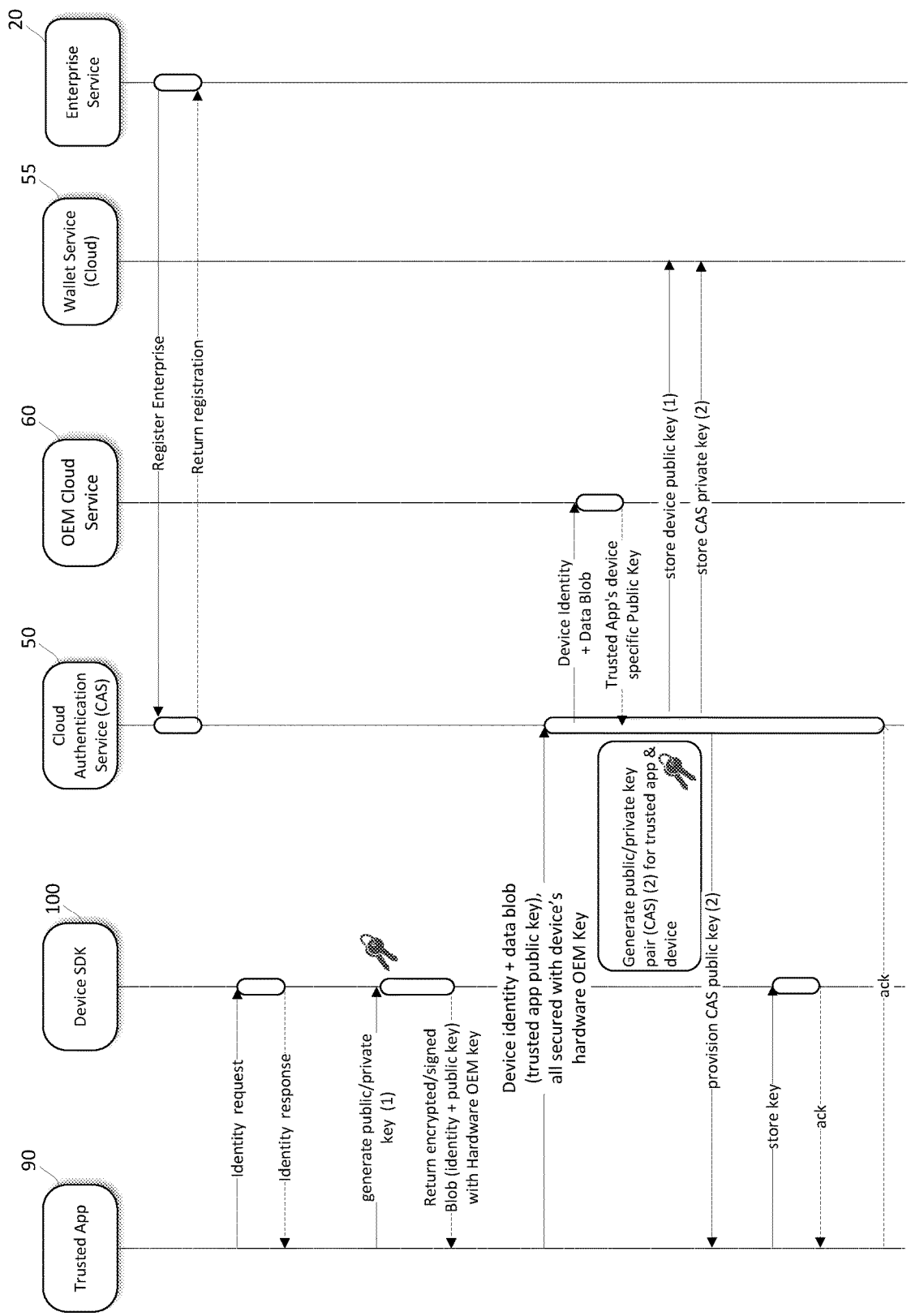
FIG. 2 is a process flow diagram of an embodiment of the invention provisioning the authentication service.

The provisioning process is also shown in FIG. 2 wherein enterprise service 20 sends a registration request to CAS 50 and CAS 50 returns registration confirmation. Trusted application 90 makes an identity request to a device SDK 100 which provides access to the TEE 110. SDK 100 provides an identity response back to trusted app 90. Trusted app 90 generates a public and private key set sent to device SDK 100 which returns an encrypted/signed blog (identity and public key) with a hardware OEM key. Trusted app 90 then sends the device identity and data blog (trusted app public key) secured with device's hardware OEM key to CAS 50. CAS 50 passing the device identity and data blob to OCS 60 which replies back with the trusted app's device-specific public key and a public/private key pair is generated by CAS 50 for the trusted app 90 and device 30. CAS 50 may store the device public key and the CAS private key in wallet service 55. CAS 50 then provisions the CAS public key back to trusted app 90. Trusted app 90 then stores the key in SDK 100 which returns an acknowledgment back to trusted app 90. Trusted app 90 then sends a final acknowledgment in the provisioning process back to CAS 50.

Figure 3:
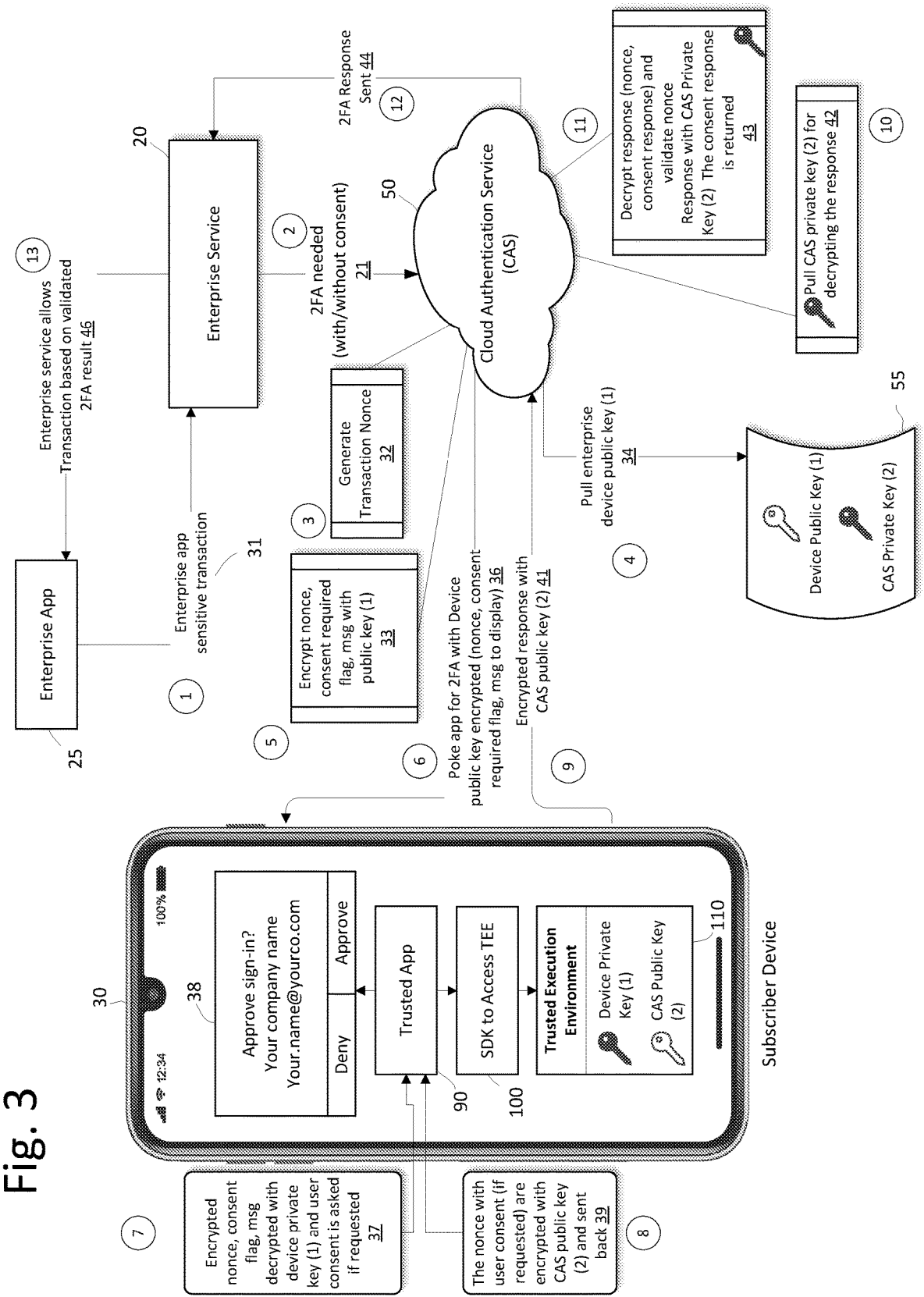
FIG. 3 is a diagrammatic view of an embodiment of the invention showing the transaction flow the authentication service.

In FIG. 3, the process of 2FA is shown according to an embodiment of the invention. Enterprise application 25 makes a request for sensitive transaction 31 to enterprise service 20. This could be, for example, a statement of financial transactions. Enterprise service 20 considers this private information and wants to further authenticate the identity of the subscriber device 30. Accordingly, enterprise service 20 makes a 2FA request to CAS 50. CAS 50 generates a transaction nonce 32 unique to this 2FA request and is not valid for subsequent requests. CAS 50 then encrypts the nonce 33 with the public key for subscriber device 30 which it opened through cloud wallet service 55 pulling the device public key 34. CAS 50 then pokes 36 trusted application 90 for 2FA using the device public key encrypted nonce and may also include a consent required flag (e.g., Boolean field) and message to display. The encrypted nonce is decrypted 37 with the subscriber device 30 private key in the TEE 110 accessed through SDK 100. If the consent required flag is true a dialog alert 38 is shown to deny or approve the 2FA sign-in on the subscriber device 30. The nonce with the user consent (if requested) is encrypted 39 with the CAS public key by trusted app 90 and sent back 41 to the CAS 50. CAS 50 pulls 42 its private key to decrypt 43 the nonce response 41 received from subscriber device 30. The decrypted nonce then validates whether the 2FA request is valid and the CAS 50 sends 44 the result back to enterprise service 20. If the 2FA response is valid 46, then enterprise service 20 allows the transaction between the enterprise service 20 and the enterprise application 25 to complete.

Figure 4:
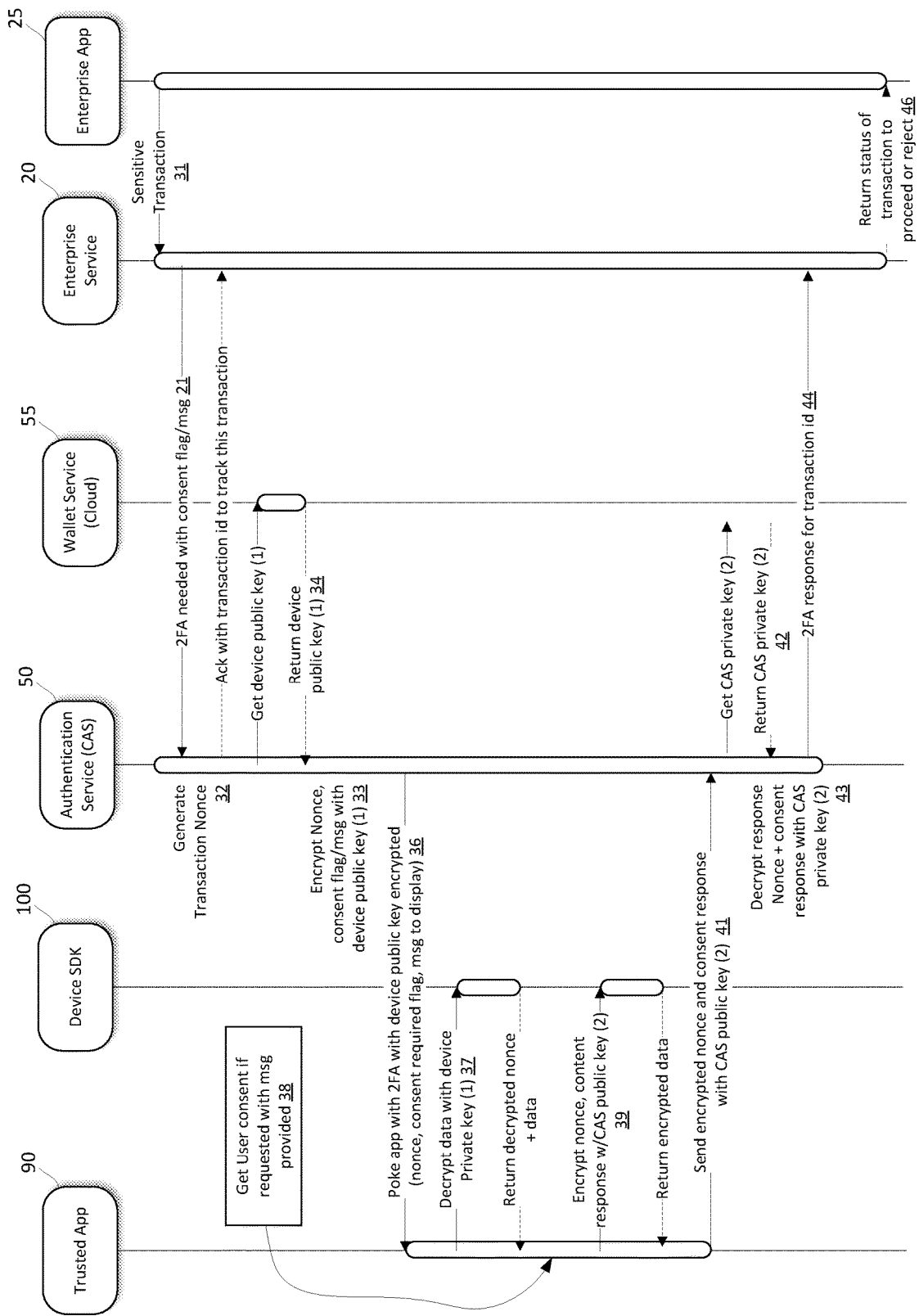
FIG. 4 is a process flow diagram of an embodiment of the invention showing the transaction flow the authentication service.

FIG. 4 shows the 2FA process in a call-flow format. Enterprise application 25 makes a request for a sensitive transaction 31 to enterprise service 20. Enterprise service 20 sends a request for 2FA with a consent flag 21 set to true to CAS 50. CAS 50 generates a nonce 32 and uses a public key 34 for the subscriber device 30 retrieved from wallet service 55 to encrypt the nonce 33 with the device public key. The 2FA request is sent 36 comprising the encrypted nonce, consent required flag and message to display to an trusted app 90 on the subscriber device 30. Through SDK 100, the TEE 110 storing both the private key for the device and the public key for the CAS is accessed. Trusted app 90 uses private key for the device 30 to decrypt 37 the nonce which is then returned to trusted app 90. If user consent is required, a prompt or dialog 38 may be presented with a provided message. The nonce and content response re-encrypted 39 using the public key for CAS 50. The (second-time) encrypted nonce along with the consent is transmitted 41 from subscriber device 30 to CAS 50. CAS 50 then accesses cloud wallet service 55 to receive 42 CAS 50 private key and decrypt 43 the nonce and consent response with the CAS private key. Validating the nonce completes the 2FA process at CAS 50 which then passes on the result 44 to enterprise service 20 for processing the original request for a sensitive transaction from enterprise application 25. Enterprise service 20 returns status 46 to proceed (in this example) or alternatively reject completing sensitive transaction 31.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICE, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Hardware equipment may be agnostic as to general computing or may be telecommunications-specific. Some equipment providers include those under the brands HUAWEI, CISCO SYSTEMS, NOKIA, and QUALCOMM.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages like ERLANG (or Open Telecom Platform, OTP) may be used or scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Terms

Access Point Name (APN) refers to a gateway between a GSM, GPRS, 3G or 4G mobile network and another computer network, frequently the public Internet. The APN identifies the packet data network (PDN) that a mobile data user wants to communicate with. In addition to identifying a PDN, an APN may also be used to define the type of service.

Application Function (AF) is a logical element of the 3GPP policy and charging control (PCC) framework which provides session related information to the policy and charging rules function (PCRF) in support of PCC rule generation.

Asymmetric Cryptography (public/private-key cryptography) means a process that uses a pair of related keys to encrypt (public) and decrypt (private) a message and protect it from unauthorized access or use.

Attestation means providing cryptographically signed evidence about the state of the device and its trustworthiness. Attestation of a mobile device identity using immutable identifying information in the Trusted Execution Environment (TEE) is a process of proving the authenticity and integrity of a mobile device's hardware, software, and identity. This process leverages the TEE, a secure and isolated environment within the mobile device's processor, to provide a high level of security and protection against tampering. Immutable identifying information refers to data that cannot be altered or changed after it is generated. In the context of device attestation, this information may include unique device identifiers, cryptographic keys, or hardware-based security features.

Attribute Value Pair (AVP) means an information element of a Diameter Protocol message. Each Diameter message will contain multiple AVPs, such as Destination-Host AVP, Subscription ID AVP, Server-Name AVP, Framed IP Address AVP and the like.

Cloud Messaging Service means a cloud-based platform that enables the sending and receiving of messages between applications, devices, and systems over the Internet. These messaging services may handle various types of messages, such as SMS (Short Message Service), MMS (Multimedia Messaging Service), push notifications, in-app messages, and email.

Diameter is an authentication, authorization, and accounting protocol for computer networks.

Diameter Routing Agent (DRA) is an element in a 3G or 4G (such as LTE) network that enables real-time routing capabilities so that messages are routed among the correct elements in a network. The DRA was launched by the 3GPP to address the increased Diameter signaling traffic and growing sophistication of 4G LTE networks.

Enterprise Service means an SMS messaging platform that businesses use to manage and execute their SMS campaigns. These platforms offer features such as contact list management, message templates, scheduling, and reporting. Some messaging platforms also provide APIs for integration with other business systems. They are used for a number of purposes that include, but are not limited to, marketing, notifications, alerts, customer support, internal communication and two-factor authentication (2FA).

Evolved Node B (eNB or eNodeB) is a base station terminating the air interface on the network side. It is responsible for all radio resource management. It is also responsible for allocation of user traffic to the downlink/ uplink, security and relaying of higher layer NAS (Non-Access Stratum) signaling to the MME.

Evolved Universal Terrestrial Radio Access Network (EUTRAN) is the radio (air interface) access architecture for LTE.

Fully Qualified Domain Name (FQDN) is a domain name that specifies its exact location in the tree hierarchy of the Domain Name System (DNS).

Gateway Mobile Switching Center (GMSC) is a function within a PLMN (Public Land Mobile Network). GMSC terminates the PSTN (Public Switched Telephone Network) signaling and traffic formats. It converts this to protocols used in mobile networks. For mobile terminated calls, GMSC interacts with the HLR (Home Location Register) to retrieve routing information.

General Packet Radio Service (GPRS) is a packet oriented mobile data standard on the 2G and 3G cellular communication network's global system for mobile communications (GSM).

GPRS Tunneling Protocol (GTP) is defined by 3GPP standards to carry General

Packet Radio Service (GPRS) within 3G/4G networks.

HLR means Home Location Register which is a database that contains subscription data about subscribers authorized to use the GSM core network. The HLRs store details of every SIM card issued by the mobile phone operator.

Home Public Land Mobile Network (HPLMN) means the network in which a mobile subscriber's profile is held. Mobile users that roam on other networks (visiting) receive subscription information from the HPLMN.

HSS means Home Subscriber Service which implements HLR and Diameter signaling. The HSS is a central database that contains user-related and subscription-related information. The functions of the HSS include functionalities such as mobility management, call and session establishment support, user authentication and access authorization. The HSS is used in IMS and 4G while HLR is used in 2G and 3G.

IMS means IP Multimedia Subsystem, an architectural framework to standardize the delivery of voice and other multimedia services of IP packet-switched networks.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

Inbound Roaming means a subscriber of another network "visits" within the local (home) network but is able to use the local network to makes calls, send messages and the like. The inbound roaming service allows subscribers from other operators to access the local network and services.

Interconnect Border Control Function (IBCF) is a boundary control between various service provider networks, providing IMS network security in terms of signaling information. It enables communication between IPv4 and IPv6 SIP applications, controlling transport plane functions, network topology hiding, screening of SIP signaling, selecting an optimum signaling interconnect, and creation of charging data records.

Interrogating Call Session Control Function (I-CSCF) is responsible for onward routing of SIP messages to the appropriate S-CSCF (Serving CSCF) for a given subscriber. It is a key element in the IMS roaming methodology.

IP Short Message Gateway (IPSMGW) is an IMS application server handling SIP based messaging services for IMS subscribers.

Key Pair refers to a set of two related cryptographic keys that are used in asymmetric encryption, also known as public key cryptography. The key pair consists of: (1) a Public Key: This key is made publicly available and is used for encryption. Anyone can use this key to encrypt data or messages intended for the owner of the key pair. Once the data is encrypted using the public key, it can only be decrypted using the corresponding private key. (2) a Private Key: This key is kept secret and is only known to the owner of the key pair. It is used for decryption, allowing the owner to decrypt the data or messages that have been encrypted using their public key. The private key can also be used to digitally sign messages, providing a means of authentication and integrity.

Long-Term Evolution (LTE) is a standard for wireless broadband communication for mobile devices and data terminals, based on the GSM/EDGE and UMTS/HSPA technologies.

Media Gateway (MGW) handles the media plane (voice) in a distributed switch.

Media Gateway Control Function (MGCF) facilitates call control, interfacing the PS domain to the circuit switched domain when interworking between the IMS and PSTN is necessary.

Mobile application part (MAP) is an SS7 protocol used to access the home location register (HLR), visitor location register (VLR), mobile switching center and other components of a mobile network infrastructure.

Mobile Switching Center (MSC) means the primary service delivery node for GSM/CDMA, responsible for routing voice calls and SMS as well as other services. The MSC connects and releases end-to-end connections, administers mobility and hand-over requirements during the call and oversees charging and real-time prepaid account monitoring.

Mobility Management Entity (MME) is a component standardized within the long term evolution (LTE) system. MME provides mobility session management for the LTE network and supports authentication, handovers and roaming between subscribers and other networks.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSIDN can change in time (e.g., telephone number portability).

Multimedia Messaging Service (MMS) is a framework to send messages that include multimedia content to and from a mobile phone over a cellular network. The MMS standard extends the Short Message Service (SMS) capability. MMS allows the exchange of text messages greater than 160 characters in length.

Nonce means an arbitrary number typically used for a single transaction in a cryptographic communication.

OEM (Original Equipment Manufacturer) refers to the company that originally produced the device. An OEM makes the components or the devices that will be bought by a company and then sold under the purchasing company's brand name. OEMs are typically manufacturers who resell another company's product under their own name and branding.

Original Equipment Manufacturer (OEM) Cloud Service refers to a cloud-based service provided by the manufacturer of a device, typically for specific applications related to that manufacturer's products. For example, a smartphone OEM might provide a cloud service for backing up user data, performing device authentication, delivering software updates, or enabling other cloud-based functionality. The cloud service provided by the OEM can serve various purposes like device management, security services, data storage and recovery, among others. These services are usually integrated into the device's operating system and work seamlessly with the device's hardware. The OEM Cloud Service can help in improving the functionality, usability, and security of the device by providing necessary services from a remote, scalable, and always accessible location—the cloud.

Outbound Roaming typically occurs when a subscriber travels to another country. That subscriber's home network has an agreement with the network he is visiting in the other country. This agreement permits the subscriber to use his mobile phone to make calls and send messages on this visiting network. The subscriber is "outbound roaming" with respect to his home network providers. Concurrently, in the view of the visited network, this subscriber is "inbound roaming." In other words, the inbound roaming service allows subscribers from other operators to access the local network and services. The outbound roaming service allows subscribers from the local network to access another operator's network and services.

Packet Data Network Gateway (PGW) is used to allocate IP addresses to the user equipment during default bearer setup.

Policy and Charging Rules Function (PCRF) is the software node designated in real-time that supports service data flow detection, policy enforcement and flow-based charging.

Proxy Call Session Control Function (P-CSCF) is a SIP proxy that is the first point of contact for user equipment in a mobile network. All SIP traffic to and from the user equipment must go through the P-CSCF. It acts as the ingress and egress point to and from a service provider's IMS domain with respect to the IMS client.

Public Switched Telephone Network (PSTN) means a circuit switched network that is used primarily for voice communications worldwide.

S6a Interface is Diameter interface between MME and HSS in the LTE network providing messages and procedures for phone attachment.

Serving Call Session Control Function (S-CSCF) is the primary node in the IMS handling session control. Subscribers are assigned a S-CSCF for the duration of their IMS registration to facilitate routing of SIP messages.

Serving Gateway (SGW) routes and forwards user data packets. The SGW manages and stores UE contexts, e.g. parameters of the IP bearer service, network internal routing information.

Serving GPRS Support Node (SGSN) is a main component of the GPRS network, which handles all packet switched data within the network.

Session Initiation Protocol (SIP) is a protocol designed to establish, maintain and terminate multimedia sessions. SIP has been adopted as the main signaling protocol in different network architectures. This SIP is deployed in 3GPP IMS (IP Multimedia System).

Short Message Service (SMS) is a text message (e.g., string of characters) generally sent from one mobile device to another over the cellular network. SMS is a text-only standard formalized in 1985 in the Global System for Mobile Communications (GSM) standards.

Signal Transfer Point (STP) is a node in an SS7 network (2G and 3G) that routes signaling messages based on their destination point code in the SS7 network.

Telephony application server (TAS) means a component used in the core network of a telecom network operator to provide telephony applications and additional multimedia functions. TAS provides the service logic for invoking the media servers to provide the call progress tones and announcements. If the calls originate or terminate on the PSTN, the TAS provides SIP signaling to the MGCF to instruct the media gateways to convert the PSTN TDM voice bit stream to an IP RTP stream and to direct it to the Internet protocol (IP) address of the corresponding IP phone.

Trusted execution environment (TEE) means a secure area of a main processor that ensures the confidentiality and integrity of the data and code executed within it. It isolates sensitive operations and data from the rest of the device's operating system, providing a higher level of security against potential threats and malicious attacks. An enterprise application in a Trusted Execution Environment is a software application designed to meet the specific needs of an organization while leveraging the security benefits of a TEE. These applications are developed to manage and process sensitive data, such as financial transactions, employee records, intellectual property, or other critical business information, while ensuring that the data remains secure and protected from unauthorized access or tampering. In a TEE, the enterprise application is executed within a separate, isolated environment from the main operating system. This separation helps to protect the application and its data from potential vulnerabilities in the operating system or other applications running on the device. The TEE also provides a secure environment for cryptographic operations, secure storage of sensitive data, and secure communications between different components of the enterprise system. Examples of enterprise applications that could benefit from a TEE include: (1) Mobile banking applications that require secure processing of financial transactions and protection of sensitive customer data; (2) healthcare applications that manage and store confidential patient information and need to comply with strict data privacy regulations; and (3) enterprise resource planning (ERP) systems that process sensitive business data and require protection from potential data breaches or unauthorized access.

Two-factor authentication (2FA), means a security process where a user must provide two different types of identification to verify their identity and gain access to an account or service. Typically, the first form of identification is something the user knows, such as a password or a PIN. The second form of identification is usually something the user has access to, in this case, their mobile device. A common example of 2FA on a mobile device is when, after entering a password to log into a service, the user receives a unique code via a text message, an email, or a specialized app on their mobile device. The user then has to enter this code into the service to verify their identity. This second layer of authentication means that even if someone else obtains the user's password, they would also need access to the user's mobile device to bypass the 2FA, thereby adding an extra level of security. Furthermore, other forms of 2FA for mobile devices can include biometric verifications such as fingerprint scanning or facial recognition technology, both of which utilize unique physical traits of the user as an additional security measure. The main objective of 2FA on mobile devices is to protect the user's data and maintain the integrity of personal accounts by requiring more than just a single piece of information to verify the user's identity.

Universal Mobile Telecommunications System (UMTS) Terrestrial Radio Access Network (UTRAN) means the radio technology used between mobile terminals and the base stations of 3G UMTS.

User Equipment (UE) means a mobile device connectable to a cellular telecommunications network.

Virtualized Mobility Management Entity (vMME) means a virtualized implementation of the main control plane entity of the network which maintains mobility state of user equipment in a network.

Visitor Location Register (VLR) means a database storing data about mobile phones that recently joined a particular area of a mobile operator's network. The VLR keeps track of roamed mobile phone subscribers and communications with the HLR to determine whether the mobile phone is a permanent or temporary subscriber.

Visited Public Land Mobile Network (VPLMN) means a network that a mobile subscriber roams on when leaving their Home Public Land Mobile Network (HPLMN).

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of provisioning two-factor authentication (2FA) for an enterprise service, the method comprising the steps of:
   a. registering an enterprise service with a cloud authentication service (CAS) for two-factor authentication;
   b. receiving from a trusted application on a subscriber device a device identity;
   c. generating by the trusted application on the subscriber device a first public/private key set;
   d. storing the first private key from the first key set in a trusted execution environment (TEE) on the subscriber device;
   e. sending the device identity and data of the generated public key, both encrypted and signed by an original equipment manufacturer's (OEM) device hardware key resident on the subscriber device through the CAS to an OEM cloud service (OCS);
   f. verifying the device identity of the subscriber device at the OCS and returning from the OCS to the CAS the trusted application's device-specific public key;
   g. generating, at the CAS, a second public/private key set for the trusted application and device comprising a CAS public key and a CAS private key;
   h. storing by the CAS in a cloud wallet service the first public key for the subscriber device and the CAS private key; and
   l. sending to the subscriber device the CAS public whereby a private key for the subscriber device and the CAS public key are stored in the subscriber device in the TEE, thereby enhancing user control over the 2FA.

2. The method of claim 1, further comprising the step of validating the device identity of the subscriber device at the OCS based on preexisting, trusted knowledge of the OEM device hardware key on the subscriber device.

3. The method of claim 1, further comprising provisioning a software development kit (SDK) to provide access between the trusted application and the TEE on the subscriber device.

4. A method of implementing two-factor authentication for an enterprise service, the method comprising the steps of:
   a. receiving from an enterprise application by an enterprise service a request to proceed with a sensitive transaction;
   b. forwarding a request for 2FA from the enterprise services to a CAS;
   c. generating, at the CAS, a transaction nonce for the request for 2FA;
   d. retrieving, by the CAS, from a cloud wallet service, a public key for the subscriber device;
   e. encrypting, by the CAS, the transaction nonce with the public key for the subscriber device;
   f. poking, by the CAS, the subscriber device for 2FA using the encrypted transaction nonce;
   g. decrypting, by the trusted application on the subscriber device, the transaction nonce using a private key for the subscriber device securely stored in a trusted execution environment (TEE) on the subscriber device, the private key a corresponding pair to the public key previously used by the CAS to encrypt the transaction nonce;
   h. responsive to consent to the 2FA request at the subscriber device, re-encrypting the transaction nonce and response with a public key for the CAS;
   1. sending the re-encrypted transaction nonce and response from the subscriber device back to the CAS;
   j. decrypting, at the CAS, the re-encrypted transaction nonce using a private key for the CAS that is a pair to the public key for the CAS used at the subscriber device to re-encrypt the transaction nonce;
   k. validating the decrypted nonce at the CAS as a valid result and forwarding the valid result from the CAS to the enterprise service; and
   l. sending the valid result from the enterprise service to the enterprise application whereby the enterprise application proceeds with the sensitive transaction as it has been validated, thereby enhancing user control over the 2FA.

5. The method of claim 4, further comprising the step of generating a user consent alert on the subscriber device based on a consent required flag transmitted along with the transaction nonce.

6. The method of claim 4, wherein the validation of the response with the decrypted transaction nonce is based on a comparison with a previously stored transaction nonce associated with the subscriber device.

7. The method of claim 4, wherein the CAS generates a unique transaction nonce for each 2FA request from the enterprise service.

8. The method of claim 4 further comprising the step of including, with the transaction nonce, a consent required flag whereby a prompt is displayed to an end user operating the subscriber device to approve or deny the 2FA authentication.

9. The method of claim 8 further comprising the step of including, with the transaction nonce and the consent required flag, a message string of characters for presenting the prompt on the subscriber device.

* * * * *